(12) United States Patent  (10) Patent No.: US 7,058,162 B2
Gadin  (45) Date of Patent: Jun. 6, 2006

(54) APPARATUS FOR TESTING AN ASYMMETRIC DIGITAL SUBSCRIBER LINE

(75) Inventor: Christian Gadin, Villemomble (FR)

(73) Assignee: France Telecom, Paris (FR)

( * ) Notice: Subject to any disclaimer, the term of this patent is extended or adjusted under 35 U.S.C. 154(b) by 193 days.

(21) Appl. No.: 10/397,063

(22) Filed: Mar. 25, 2003

(65) Prior Publication Data

US 2004/0076267 A1    Apr. 22, 2004

(30) Foreign Application Priority Data

Mar. 26, 2002 (FR) ................................. 02 03722

(51) Int. Cl.
*H04M 1/24* (2006.01)

(52) U.S. Cl. .................. 379/21; 379/26.01; 379/29.01; 379/29.02

(58) Field of Classification Search ............ 379/21, 379/1.03, 9, 9.06, 15.01, 22.02, 22.04, 22.06, 379/26.01, 27.01, 27.07, 28, 29.01, 29.02, 379/29.03
See application file for complete search history.

(56) References Cited

U.S. PATENT DOCUMENTS

| | | | |
|---|---|---|---|
| 3,912,882 A | 10/1975 | Beerbaum | |
| 4,912,755 A | 3/1990 | Blood et al. | |
| 5,105,438 A | 4/1992 | Ackroff et al. | |
| 6,215,855 B1 | 4/2001 | Schneider | |
| 6,295,339 B1 * | 9/2001 | Jollota | ..................... 379/22.04 |
| 6,298,118 B1 | 10/2001 | Ligget | |
| 6,516,053 B1 * | 2/2003 | Ryan et al. | ................... 379/21 |
| 6,819,745 B1 * | 11/2004 | Hollenbeck et al. | ....... 379/1.03 |
| 2001/0026607 A1 | 10/2001 | Scholtz et al. | |

FOREIGN PATENT DOCUMENTS

| | | |
|---|---|---|
| EP | 1 089 536 | 4/2001 |
| WO | WO 01/45432 | 6/2001 |
| WO | WO 01/95598 | 12/2001 |

* cited by examiner

*Primary Examiner*—Barry Taylor
(74) *Attorney, Agent, or Firm*—Meyertons, Hood, Kivlin, Kowert & Goetzel, P.C.; Eric B. Meyertons

(57) ABSTRACT

This apparatus for testing an asymmetric digital subscriber line includes, arranged in a case, a low-frequency signal generator which generator is adapted to be connected to an input terminal block of an access multiplexer of a telephone exchange and which generator is adapted to inject into the latter a signal simulating the presence of a telephone line, an amplifier linked to a speaker and intended to be connected to an output terminal block of the said multiplexer and intended to retrieve and amplify the signal transmitted by the generator to an audible level, and a modem intended to be connected to the said output terminal block to test a modem of the access multiplexer by checking synchronization between these modems.

6 Claims, 4 Drawing Sheets

US 7,058,162 B2

APPARATUS FOR TESTING AN ASYMMETRIC DIGITAL SUBSCRIBER LINE

BACKGROUND OF THE INVENTION

1. Field of the Invention

The present invention relates to an apparatus for testing an asymmetric digital subscriber line (ADSL).

2. Brief Description of the Related Art

Conventionally, to check that an ADSL line is operating correctly, a set of telecommunication equipment intended to simulate a subscriber's installation needs to be connected to the access multiplexer of a telephone exchange.

Thus, a full and temporary installation is necessary so that a test of operation can be performed which is the same as a test that would have been performed at a subscriber's premises.

As one can imagine, such a checking technique is relatively tedious to set up, and furthermore requires electrical current supply terminals to be placed in the immediate vicinity of the connection points of the various elements forming part of such an installation.

SUMMARY OF THE INVENTION

Hence, the aim of the invention is to overcome this drawback and to provide an apparatus, forming a portable unitary assembly, for testing an ADSL telephone line, and to simplify the process of checking for correct operation of the line.

Hence, according to one aspect of a test apparatus, the apparatus includes, arranged in a case, a low-frequency signal generator which is capable of generating a frequency that is compatible with the rated frequency of the telephone line, which generator is adapted to be coupled to an input terminal block of an access multiplexer of a telephone exchange and which generator is further adapted to inject into the latter a signal simulating the presence of a telephone line; an amplifier linked to a speaker and intended to be coupled to an output terminal block of the said access multiplexer and intended to retrieve and amplify the signal transmitted by the generator to an audible level; and a modem intended to be coupled to the output terminal block to test a modem of the access multiplexer by checking synchronization between these modems.

This apparatus is therefore a portable assembly that can be installed easily to simulate a subscriber's telecommunication installation.

According to one feature of this apparatus, the amplifier is linked to a line socket unit controlling the actuation of the low-frequency signal generator.

According to another feature of this apparatus, the apparatus additionally includes a low-pass filter placed at the input of the amplifier and intended to remove the high-frequency component in the signal received from the said multiplexer and intended to let the low-frequency component, corresponding to a telephony signal pass.

As a preference, this apparatus additionally includes means for detecting a telephone line, which means are coupled to the input terminal block of the multiplexer.

According to one embodiment, the detection means comprise a detector able to detect a voltage of 48 V reflecting the connection of a telephone line and which detector is integrated in the low-frequency signal generator.

As a preference, the modem has a connection terminal for connecting it to a computer.

Advantageously, the apparatus additionally includes a rechargeable power supply battery linked to a charge-current control circuit and to a battery charge level monitoring circuit.

BRIEF DESCRIPTION OF THE DRAWINGS

Other aims, features and advantages of the invention will become apparent from the following description, given only as a non-limiting guide, and given with reference to the appended drawings in which.

DETAILED DESCRIPTION OF PREFERRED EMBODIMENTS

Figure 1:
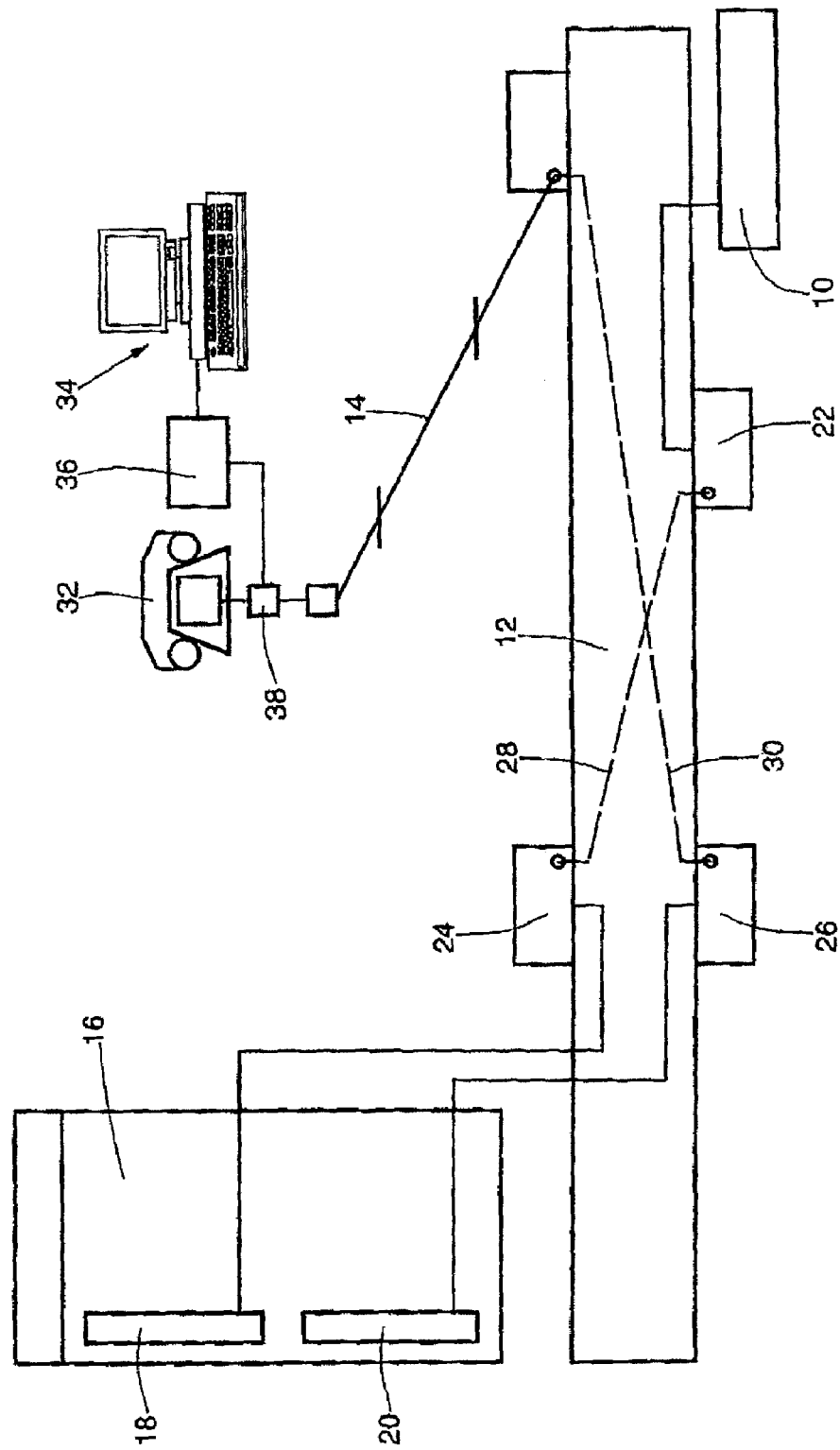
FIG. 1 is a block diagram of an ADSL installation.

FIG. 1 shows the general architecture of a conventional ADSL installation.

As FIG. 1 shows, a conventional ADSL installation includes a telephone exchange 10 and a general distribution frame 12, to which general distribution frame 12 are connected a set of subscriber telephone lines such as 14 and a multiplexing rack 16 incorporating a filtering board 18 and a modem board 20.

For connecting these different elements, the general distribution frame 12 is equipped with a first terminal block 22 intended for connecting telephone equipment and to which the automatic exchange 10 is connected, a second terminal block 24 forming an input terminal block of the ADSL stage of the telephone exchange and to which terminal block the filtering board 18 is connected, and a third terminal block 26 forming an ADSL output terminal block of the telephone exchange, to which terminal block the modem board 20 of the multiplexing rack is connected.

A first jumper 28 runs from the first terminal block 22 to the second terminal block 24. A second jumper 30 runs from the third terminal block 26 to the telephone lines 14.

At the remote end, that is the premises of each subscriber, telephone equipment consisting of a telephone set 32 and a microcomputer 34 connected to an ADSL modem 36 are connected to the telephone line 14 via a filter 38 that separates the high-frequency signals and the voice signals transmitted over the telephone line 14.

With reference to FIGS. 2 to 6, a test apparatus in accordance with the invention, intended to check an asymmetric digital subscriber line (ADSL), shall now be described.

Figure 2:
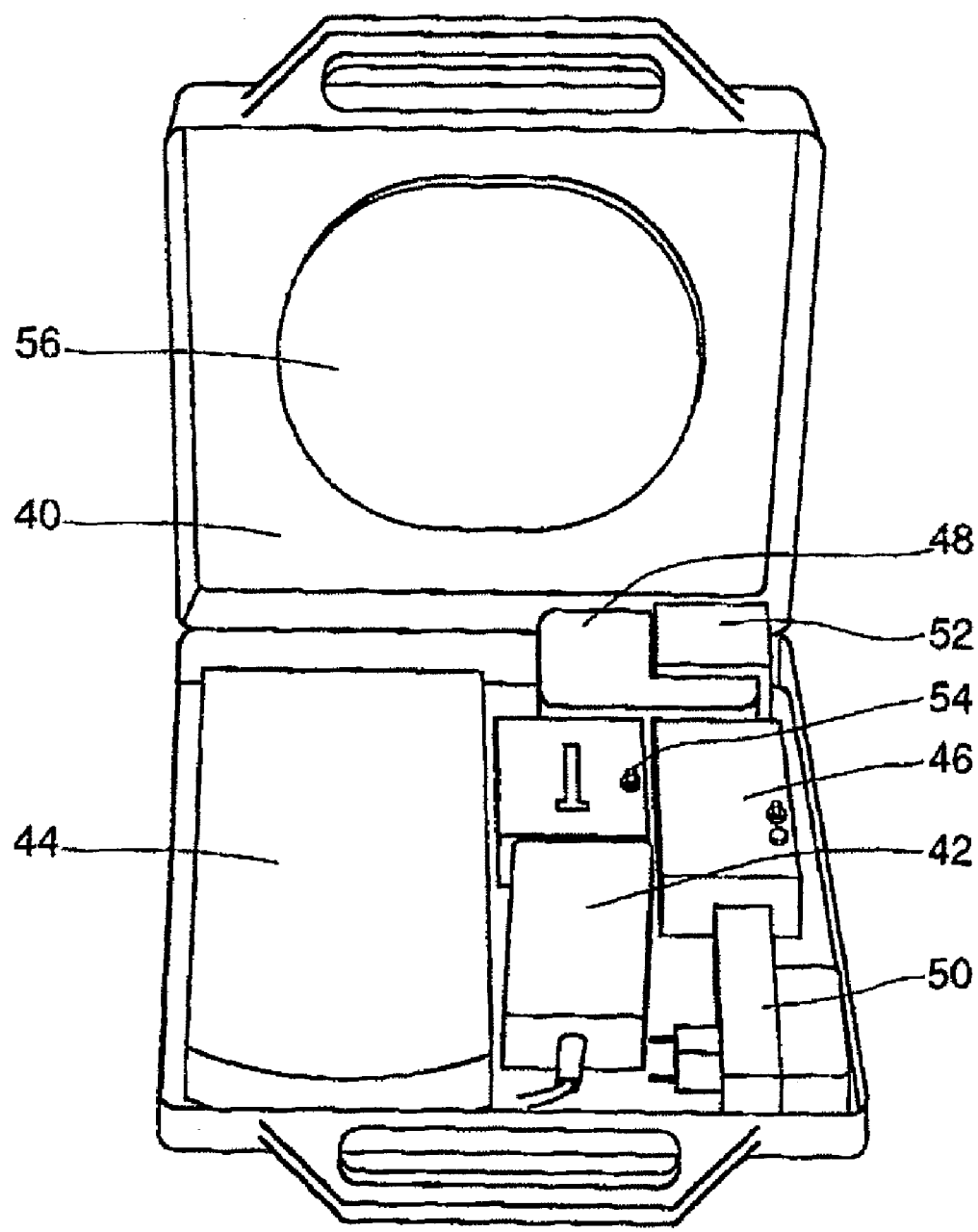
FIG. 2 is a perspective view of an apparatus for testing an ADSL telephone line in accordance with the invention.

Referring first to FIG. 2, it can be seen that the test apparatus forms a portable and standalone unitary assembly.

The test apparatus includes, placed in a case 40: a low-frequency signal generator 42, an ADSL modem 44, a low-frequency amplifier 46, a power supply battery 48 linked to a charger 50 and a charge controller 52, and a line socket unit 54 incorporating a telephone socket.

A connection cable completes the assembly, which cable is carried on a reel 56 and intended to connect the test apparatus either to the general distribution frame, in order to connect it to the multiplexer of the telephone exchange, or at any point on the telephone line 14, even at the subscriber's premises.

Figure 3:
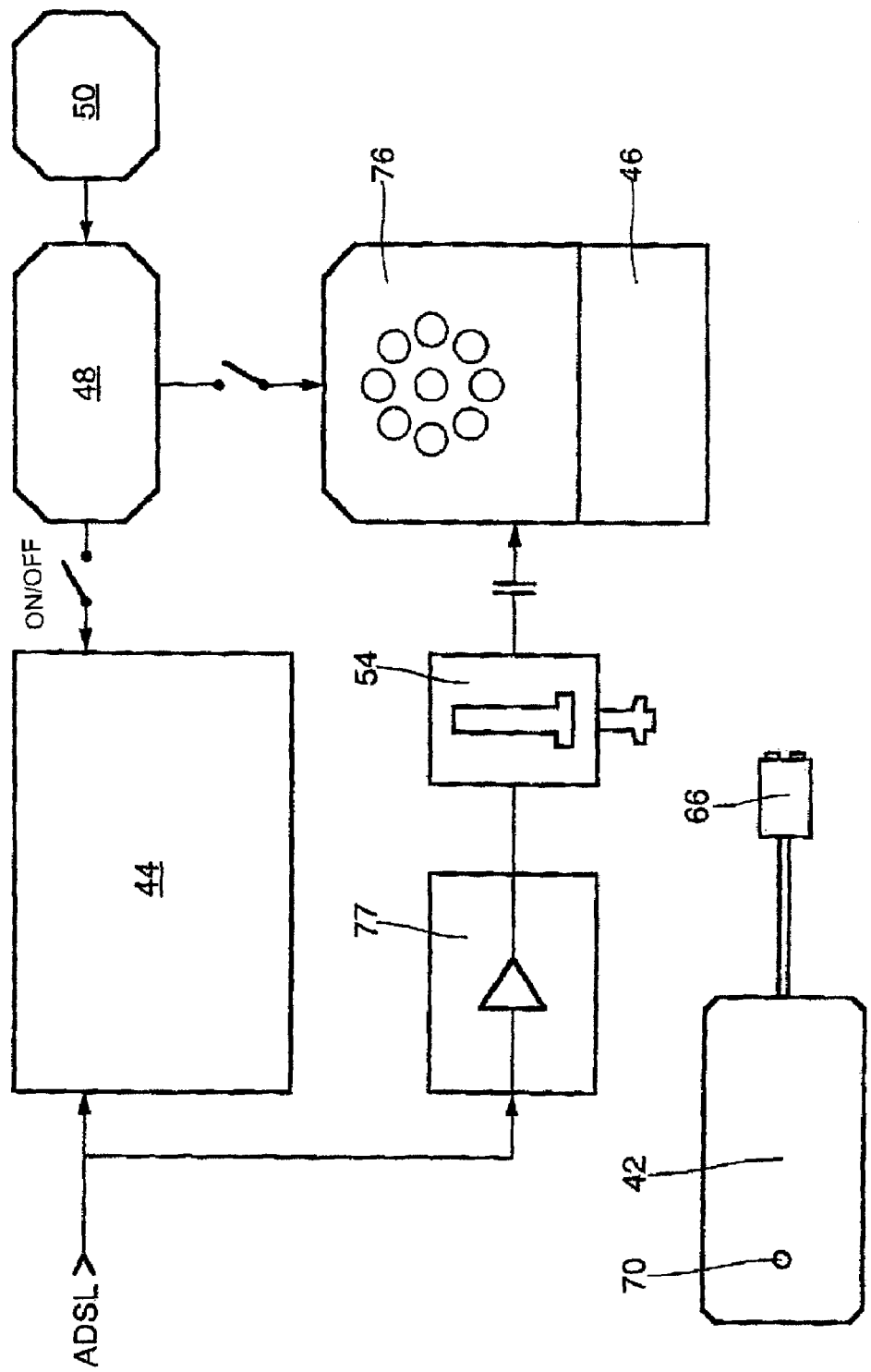
FIG. 3 is a block diagram illustrating the general structure of the test apparatus of FIG. 2.
Figure 4:
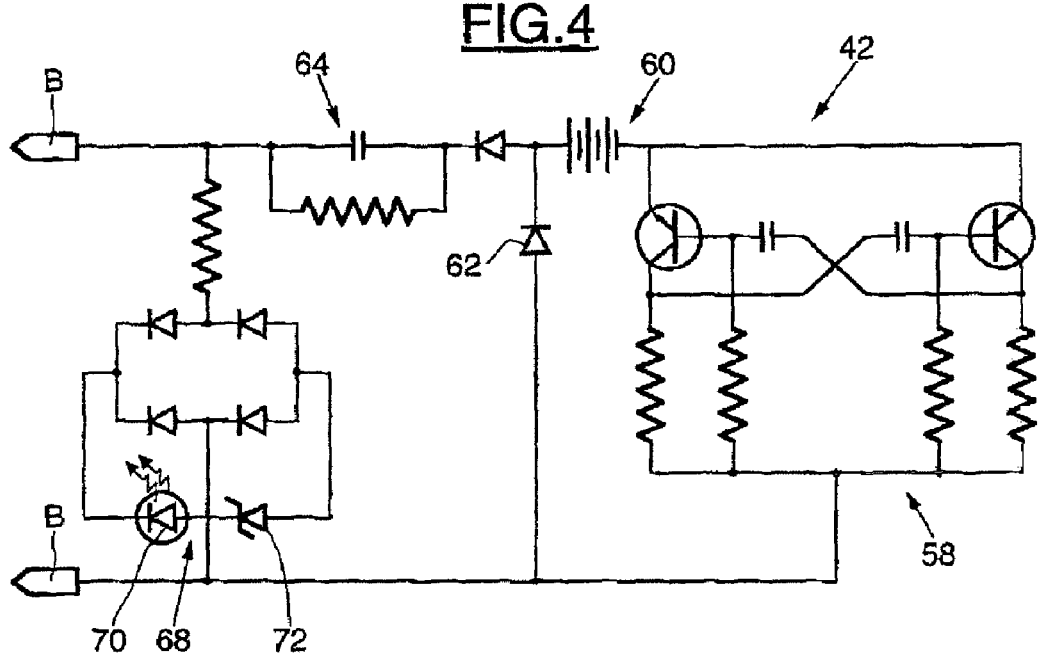
FIG. 4 is a circuit diagram illustrating the design of the low-frequency signal generator of the test apparatus of FIG. 3.

Referring to FIGS. 3 and 4, the low-frequency generator 42 essentially consists of a multivibrator stage 58 powered by a battery 60 and intended to deliver a low-frequency signal according to a frequency that is compatible with the rate of frequency of the telephone line to be tested, that is according to a frequency within a range of about 300 to 3400 Hz.

This multivibrator stage 58 is connected, via a protection diode 62 and current limiting elements 64, to a plug 66 for connecting the generator 42 to the input terminal block 24 of the multiplexer of the telephone exchange or, alternatively, to the first terminal block 22 which is for connecting telephone equipment.

This low-frequency signal generator is completed by a conventional type voltage detection circuit 68 that is able to detect a voltage of 48 volts on the terminal block to which it is connected, thus reflecting the connection of a telephone line to the general distribution frame.

To indicate the presence of such a voltage to an operator, this detection circuit 68 is equipped with a light-emitting diode 70.

This detection circuit 70 additionally incorporates a Zener diode 72 placed on the current path between the terminals of the battery 60 and intended to prevent any discharge of the battery when the test equipment is not operating.

The generator that has just been described is intended to collaborate with the low-frequency amplifier 46 to check the integrity of the link between the jumpers.

Figure 5:
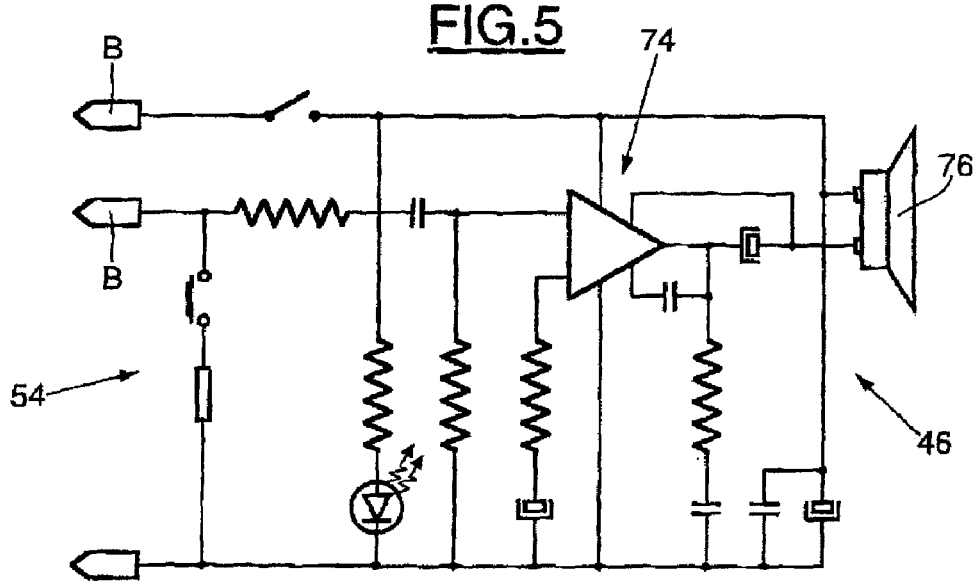
FIG. 5 is a circuit diagram showing the design of the amplification circuit of the test equipment of FIG. 3.

Referring to FIG. 5, this low-frequency amplifier, which is connected to an input terminal B on the test apparatus, essentially incorporates a conventional type amplification stage 74, based on an operational amplifier, one of the input terminals of which is connected to the line socket unit 54.

The low-frequency amplifier additionally includes a speaker 76 connected to the output of the amplification stage 74.

The low-frequency amplifier 46 is intended to be connected to the ADSL output terminal block 26 to retrieve and amplify the signals conveyed between the second and third terminal blocks, or even between the first and third terminal blocks.

Figure 6:
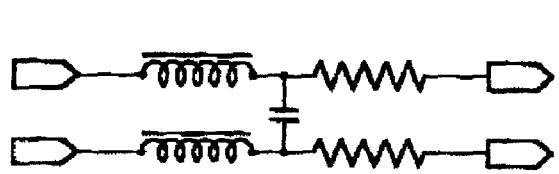
FIG. 6 shows the structure of the low-pass filter forming part of the test equipment of FIG. 3.

As FIG. 3 shows, an inductance-based passive low-pass filter 77, the structure of which is shown in FIG. 6, is connected between the inputs of the modem 44 and of the line socket unit 54 or between the line socket unit and the amplifier 46 such that high-frequency components, corresponding to ADSL content, are allowed to pass through to the modem and low-frequency components are allowed to pass through to the amplifier 46.

As regards the line socket unit, this device is intended to simulate a telephone set being placed off-hook. It is connected between the low-frequency signal generator 42 and the amplifier 46 such that an action on the line socket unit causes the generator to switch on. It is equipped with a telephone socket for connecting telephone equipment during a service intervention.

Thus, to test the integrity of the link between the second and third terminal blocks, the low-frequency generator should be connected to the second terminal block 24 and the input terminal B of the apparatus should be connected to the third terminal block. Of course, if a telephone line is connected to the first terminal block, the low-frequency signal generator is not used.

When the push-button on the line socket unit 54 is pressed, the signal transmitted by the low-frequency generator is retrieved by the amplifier 74, which amplifies it to an audible level, and then it is delivered to the speaker 76.

The sensing of this signal therefore reflects the continuity of the link between the second and third jumpers and indicates that the modulation conveyed on the telephone line is correctly transmitted.

However, if no tone is heard, if the generator is connected to the first terminal block 22, the integrity of the first jumper 28 should be tested, in a manner known per se.

If this jumper 28 is not defective, the filtering board 18 of the multiplexing rack 16 should then be changed.

Finally, to check that the modem board 20 is operating correctly, the modem 44 is connected to the third, ADSL output, terminal block 26, and a subsequent correct synchronization between these modems reflects the integrity of the modem board 20. Finally, the connection of a computer to a connection terminal incorporated on the modem of the test apparatus can be used to check access to an internet network and therefore to check that the software resources are appropriately declared.

The above description applies to the testing of an asymmetric digital subscriber line at a telephone exchange.

However, it can be seen that such a test can also be carried out, by means of the test apparatus according to the invention, at a subscriber's premises, by connecting the apparatus directly to the subscriber's telephone socket.

In this case, the subscriber's telephone set 32 can be connected to the telephone socket provided in the line socket unit 54.

The subscriber's microcomputer is then connected to the modem 44 of the test apparatus.

Then, in a similar way to the procedure described previously, a process for detecting any possible discontinuity in the telephone line between the first, second and third connection terminal blocks is carried out, so as to check for correct operation of the filtering board 18, check for correct synchronization between the modem board 20 and the modem 44 of the test apparatus, and check for access to the Internet.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for testing an asymmetric digital subscriber line, the apparatus comprising a portable unitary assembly, wherein the portable unitary assembly is arranged in a case and comprises a low-frequency signal generator configured to generate a frequency that is compatible with a rated frequency of the telephone line, which generator is adapted to be coupled to an input terminal block of an access multiplexer of a telephone exchange and which generator is adapted to inject into the latter a signal simulating the presence of a telephone line; an amplifier linked to a speaker and intended to be connected to an output terminal block of the access multiplexer and intended to retrieve and amplify the signal transmitted by the generator to an audible level; and a modem intended to be connected to the output terminal block to test a modem of the access multiplexer by checking synchronization between the modem of the apparatus and the modem of the access multiplexer, wherein the amplifier is linked to a line socket unit controlling the actuation of the low-frequency signal generator.

2. The test apparatus of claim 1, further comprising a low-pass filter placed at the input of the amplifier and intended to remove a high-frequency component in the signal received from the multiplexer and intended to let a low-frequency component, corresponding to a telephony signal, pass.

3. The test apparatus of claim 1, further comprising means for detecting a telephone line, which means are connected to the input terminal block of the multiplexer.

4. The test apparatus of claim 3, wherein the detection means comprises a detector able to detect a voltage of 48 V reflecting the connection of a telephone line and which detector is integrated in the low-frequency signal generator.

5. The test apparatus of claim 1, wherein the modem has a connection terminal for connecting the modem to a computer.

6. The test apparatus of claim 1, further comprising a rechargeable power supply battery linked to a charge-current control circuit and to a battery charge level monitoring circuit.

* * * * *